United States Patent [19]
Frost

[11] 3,815,464
[45] June 11, 1974

[54] GAS OPERATED SINGLE STROKE SERVO-MOTOR

[75] Inventor: Richard H. Frost, Littleton, Colo.

[73] Assignee: Frost Engineering Development Corporation, Englewood, Colo.

[22] Filed: Jan. 17, 1973

[21] Appl. No.: 324,344

[52] U.S. Cl. ........................... 83/639, 92/34, 92/90
[51] Int. Cl. .............................................. B26d 5/12
[58] Field of Search ..................... 83/639; 92/34, 90

[56] References Cited
UNITED STATES PATENTS
3,230,812   1/1966   Pucci et al. .................... 83/639 X FOREIGN PATENTS OR APPLICATIONS
1,450,455   7/1966   France ................................ 83/639

Primary Examiner—J. M. Meister
Attorney, Agent, or Firm—Edwards, Spangler, Wymore & Klaas

[57] ABSTRACT

A gas operated single stroke servo-motor characterized by a partially collapsed tubular member cooperating with closures at both ends thereof to define a pressure vessel operative upon the introduction of a pressurized fluid therein to expand and, in so doing, drive a tool or the like connected thereto from a retracted into an extended position.

17 Claims, 7 Drawing Figures

3,815,464

GAS OPERATED SINGLE STROKE SERVO-MOTOR

Many applications can be found where a need exists for a powerful single stroke servo-motor operative upon actuation to move a tool or other element responsive thereto over a short distance. Quite often, such units are expendable after a single actuation and, thus, a primary requirement becomes one of dependability over an extended period of time rather than the fact that it can be reused. When designed for one time use, however, cost becomes a significant factor as do such things as simplicity, negligible maintenance, ease of replacement and the absence of a need for repair. Generally speaking, apparatus of this type is quite often used as a means for operating safety equipment or escape devices although its application is by no means restricted to such things. One such application is that of a webbing cutter for use in military aircraft and the like by the pilot and crew for the purpose of instantaneously cutting themselves free of various and sundry restraints which would otherwise prevent their escape in an emergency situation.

In my copending application Ser. No. 321,514, filed Jan. 5, 1973 for Gas Operated Quick Disconnect Coupling, I disclose a gas operated quick disconnect coupling for use in emergency situations to unlock and release a buckle type connector of the type used to releasably interconnect the ends of a strap or other restraining element together. Unfortunately, not all the straps, belts, tubes and the like that link a crew member to his aircraft are provided with disconnect fittings. On the contrary, various considerations demand that such disconnect couplings only be used where absolutely necessary to provide for normal ingress and egress from the aircraft and such things as the lap belt, parachute and canopy release harnesses associated therewith. There remain, therefore, certain belts, straps, tubes and other personnel restraints that must be cut and severed as part of the divestment system necessary to free the crew member therefrom and permit his escape from the aircraft under certain emergency situations. It is in a situation just such as this that the instant gas operated single stroke servomotors finds its primary application.

The woven web belting used in military aircraft crew restraint systems is exceedingly strong and difficult to cut, especially when slack rather than under heavy tension where sometimes only a few threads need be severed before the material is weakened to a point where it will tear apart. Accordingly, the cutter subassembly used to sever same must generate a considerable amount of power and transfer it efficiently to the blade. Compactness is of considerable importance as is the weight of the unit along with its long term reliability. Some sort of self-contained independent power source like a bottled gas or preferably a pyrotechnic device is a "must" because, under emergency conditions, there is no assurance that the aircraft's electrical system will be operative.

The instant servo-motor answers all of the above requirements along with several others. For instance, it is of extremely simple construction in that the distension of the collapsed tube in response to the release of gas therein is employed to directly drive the cutter blade through the strap. The force applied to the blade is essentially uniform throughout its length. Tolerances are not especially critical in that small gas leaks can be tolerated during the brief interval during which the single extension stroke occurs. As long as the power supply remains viable, there is little that can go wrong with the servo-motor itself despite long periods in the cocked or "ready" state in which condition it remains until undergoing its single actuation.

Accordingly, it is the principal object of the present invention to provide a novel and improved single stroke servo-motor.

A second object of the invention is the provision of a device of the type aforementioned that is gas operated and thus can be made independent of those primary power sources likely to fail under emergency conditions.

Another objective of the within described invention is to provide a short stroke linear actuator which, when powered by a squib, or a source of gas under pressure, will instantly and reliably move a tool with considerable force against a workpiece.

Still another object of the invention herein disclosed and claimed is to provide a self-contained cutter subassembly ideally suited for use as a means for severing web belt restraints of the type found in a military aircraft.

An additional objective is the provision of a webbing cutter that can be relied upon to apply a substantially uniform cutting force along the entire length of a wide blade.

Further objects are to provide a device for cutting the belts, straps and tubes restraining the crewmen in a military aircraft that is simple, compact, lightweight, dependable, maintenance-free, powerful, versatile and even somewhat decorative in appearance.

Other objects will be in part apparent and in part pointed out specifically hereinafter in connection with the description of the drawings that follows, and in which.

Figure 1:
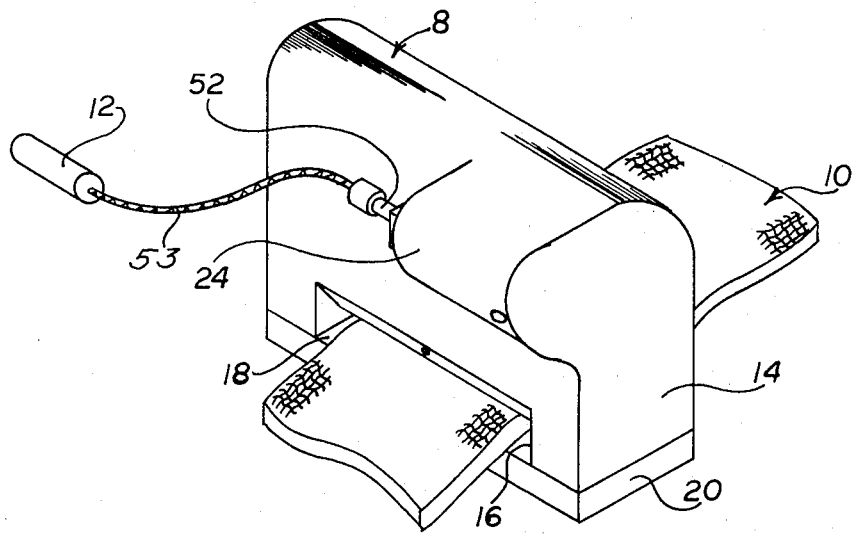
FIG. 1 is a perspective view looking down and to the right upon the servo-motor of the present invention showing a length of web belting passed therethrough in position to be cut.
Figure 6:
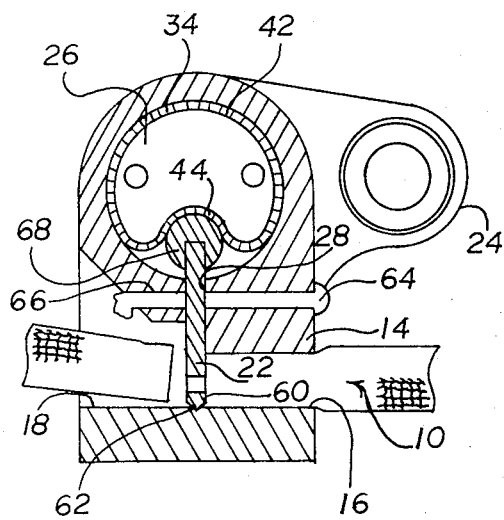

Referring next to the drawings for a detailed description of the present invention and, initially, to FIG. 1 for this purpose, reference numeral 8 has been chosen to represent the servo-motor in its entirety while numeral 10 designates a web belt to be cut thereby and numeral 12 a pyrotechnic type self-contained source of gas to be used as the operating medium. The body 14, in the particular form illustrated, comprises a metal block having a wide strap receiving slot 16 above the base 20 thereof, this base defining an anvil 18 atop which the belt 10 is supported while the cutter subassembly 22 moves thereagainst as shown in FIG. 6 to be described in detail presently. An integrally formed boss 24 projects laterally from the inlet end of the body and receives the gas that drives the servo-motor.

Next, with reference to the remaining FIGS. 2–6, inclusive, of the drawings, the body will be seen to include a cavity 26 extending transversely across the top thereof and communicating with the belt receiving slot 16 by means of cutter bar guide slit 28. Cavity 26, in the particular form shown, is cylindrical and terminates at the upstream end of the body in a planar wall surface 32 disposed at right angles to the axis of the latter as well as that of collapsed tubular member 34 housed therein. The downstream end of the cavity is closed and sealed by a cylindrical plug 36 that screws into the threaded section 38 thereof. The inside wall surface 40 of this plug is planar as well as lying in normal relation to the cavity axis and that of tubular element 34. Plug 36 is screwed snugly against the downstream end of the collapsed tubular member 34 thus forcing it into essentially gas-tight sealed engagement against the opposed parallel wall surface 32. Actually, as a practical matter, a true gas-tight pressure chamber needn't be formed within collapsed tubular member 34 because a sufficient volume of gas is released therein over such a short period of time that the required tube expansion pressure can be generated before any gas escaping due to minor leaks at the ends can become significant. A pyrotechnic hot gas is usually preferred due to the generation of a shock wave and the heat tends to expand the parts to effect a seal. The device, however, is a good heat sink and the pressure dissipates quickly from cooling. It is significant, however, that the opposed wall surfaces 32 and 40 cooperate with the tube ends mating therewith to maintain an essentially gas-tight chamber through the full excursion of the tube between its collapsed position of FIG. 5 and its distended position of FIG. 6.

Now, the tubular member 34 will be seen, in the particular form shown, to comprise a short length of thin-walled deformable metal tubing of standard generally cylindrical configuration although, obviously, it could have other than a circular cross section and still function just as well for its intended purpose. The upper semi-cylindrical arch 42 of the tubular element remains essentially undeformed and is backed up by the cylindrical surface of the cavity 26 in which it is housed. The lower half 44 of the tubular element 34, on the other hand, is deformed by bending it upwardly so as to produce what will be referred to here as a centrally located "open fold" 46 that separates a pair of generally pear shaped lobes 48 on both sides thereof. Obviously, the resulting partially collapsed condition of the tubular element revealed most clearly in FIG. 5 reduces the volume in the pressure chamber defined by it and the wall surfaces closing its ends to a small fraction of that it has when fully distended.

Figure 2:
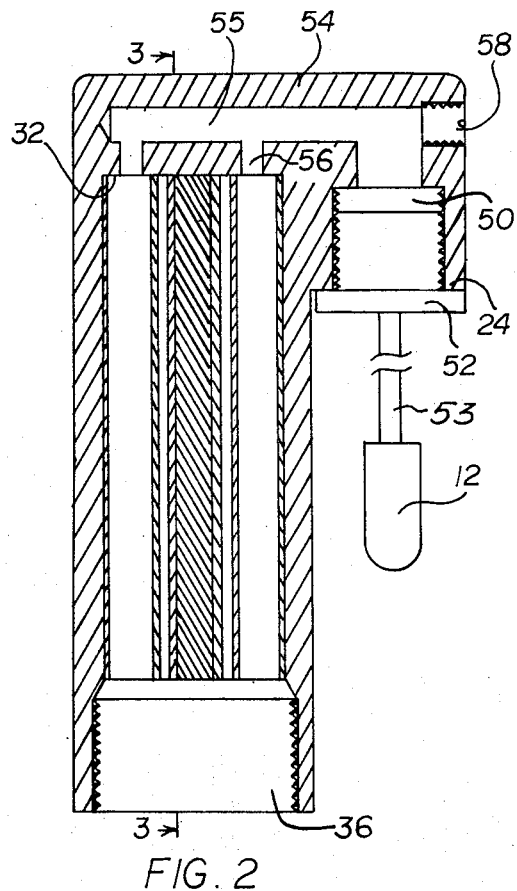
FIG. 2 is a horizontal diametrical section, a portion of which has been broken away to conserve space.

In FIG. 2 it will be seen that boss 24 is provided with an internally threaded cup shaped cavity 50 into which a suitable threaded fitting 52 is screwed. Fitting 52 may include a pyrotechnic device or merely connect the cavity 50 to a source 12 of gas under pressure via conduit 53; alternatively 12 may be a pyrotechnic igniter with conduit 53 being deflagrating or mild detonating cord to ignite pyrotechnic device 52. The gas source 12 preferably comprises some sort of pyrotechnic type high energy transfer medium which, upon ignition, almost instantly generates hot gaseous products of combustion at a controlled high pressure level that is sustained over an interval sufficient to insure completion of the work stroke. Such self-contained energy sources are well known in the prior art and are widely used in applications such as this for generating high instantaneous gas pressures.

Gas fitting cavity 50 communicates the interior of mainfold 54 which, in turn, delivers the pressurized gaseous products of combustion into the interior of both lobes 48 of partially collapsed tubular element 34 by means of branch passages 56. While one such branch passage would suffice, two are preferred as shown. The manifold as illustrated comprises a blind bore 55 with a plug 58 inserted into its open end.

Figure 5:
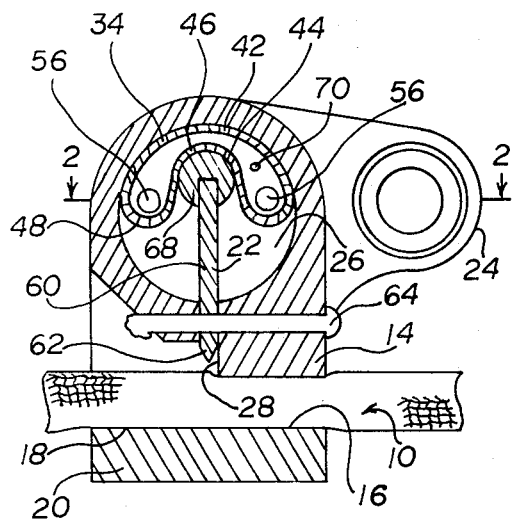
FIG. 5 is a transverse section taken along line 5—5 of FIG. 3 showing the servo-motor preparatory to actuation; and, FIG. 6 is a section similar to FIG. 5 except that it shows the unit following actuation thereof.

In FIGS. 5 and 6 to which reference will now be made, it can be seen that cutter blade guide slit 28 formed in the body that interconnects cavity 26 with the belt receiving slot 16 lies directly beneath the open fold 46 in the partially collapsed tube and in essentially parallel relation thereto. The lower marginal area of the blade 60 that borders sharpened edge 62 thereof is retained within the aforementioned slit 28 for guided vertical sliding movement from its retracted position of FIG. 5 into its extended position of FIG. 6. The sharpened blade is releasably retained in its retracted position by shear pin 64 that passes therethrough and is mounted within transverse passage 66 that intersects slit 28 intermediate its ends.

In addition to blade 60 and shear pin 64, the cutter subassembly 22 also includes a spine forming member 68 that extends along the upper marginal edge of the blade from one extremity thereof to the other and which is received in the open fold 46 of the tubular element 34. This spine forming member acts as a backbone to stiffen the blade against deflection and also provides a wide, smooth generally semi-cylindrical surface to receive the thrust exerted thereon by the tubular element during its power stroke.

Figure 3:
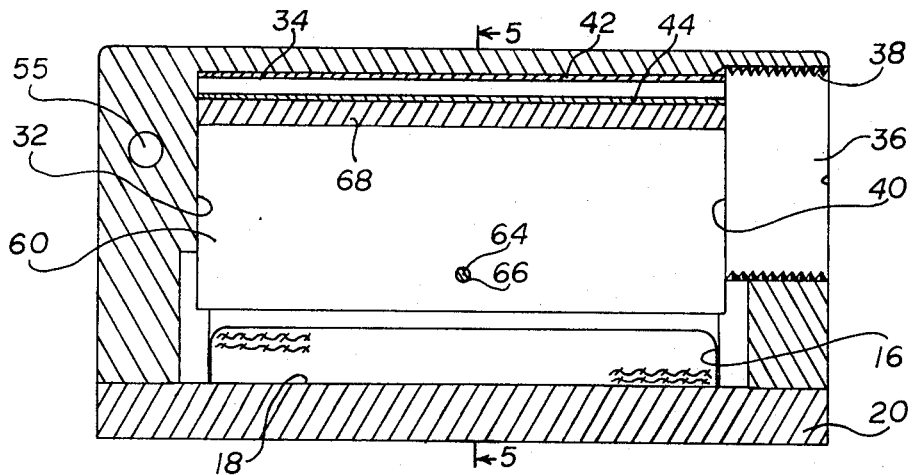
FIG. 3 is a vertical diametrical section taken along line 3—3 of FIG. 2.
Figure 4:
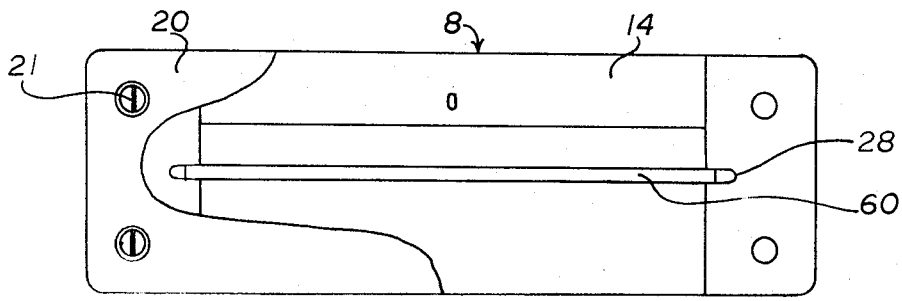
FIG. 4 is a bottom plan view, portions of which have been broken away and shown in section.

In FIGS. 3 and 4 it will be noted that the anvil 18 is provided as the upper surface of block 20 which is fastened to the bottom of the body 14 as by means of screws 21. The anvil 18 and blade 60 are substantially coextensive in width whereas the width of the belt 10 is somewhat narrower as is belt receiving slot 16. Thus, the slot 16 confines the belt to that portion of the anvil intermediate its ends where the belt is sure to be cut all the way across. Even though the belt is a good deal narrower than the slot and passes through the latter in skewed relation thereto, the cutter subassembly 22 will still cooperate with the anvil to sever it completely.

Finally, with brief reference once again to FIGS. 5 and 6, it will be noted that as the gas is released into the partially collapsed tubular element 34, it distends same and attempts to restore it to its original undeformed condition. In so doing, the upper semi-cylindrical arch thereof is retained against deformation by the corresponding arch of the body cavity and the tube, therefore, can only expand downwardly where it is unrestrained. As it does, it drives the blade down and shears off the shear pin preparatory to severing the belt and stopping against the anvil in the actuated position of FIG. 6. It will also be noted in FIGS. 5 and 6 that belt 10 has the right hand side thereof firmly clamped between the upper surface of the belt receiving slot found between body 14 and base 20 so that when the belt is cut the device 8 is retained in clamped relation on the right hand portion of the cut belt 10, while the other side of the belt is free.

To rearm the unit, the plug is removed from the end of the body and the expanded tubular element removed therefrom and discarded. The shear pin ends must also be removed preparatory to recocking the cutter subassembly and holding it in its retracted or cocked position with a new shear pin passed therethrough. Next, a new partially collapsed tubular element 34 can be inserted along the spine of the blade until it abuts the remote cavity wall; whereupon, the plug can be reinserted and screwed up snug against the adjacent end of the collapsed tube so as to produce an essentially gas-tight chamber. Finally, the spent pyrotechnic gas generator 12 can be replaced with a fresh one and the system is ready to go again. It should be noted that where additional gas pressure is desired or other firing characteristics from a pyrotechnic gas generator, an amount of pyrotechnic material 70 can be positioned as desired within the interior of chamber of tubular element 34, FIG. 5.

Figure 7:
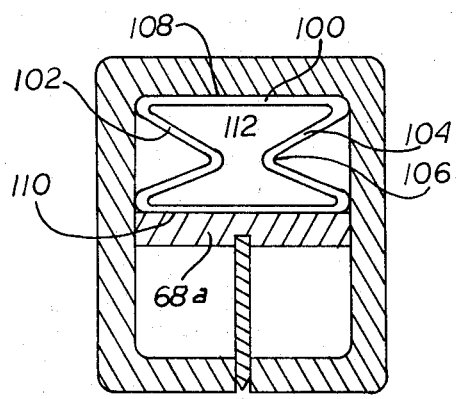
FIG. 7 is a sectional view of a rectangular tube with opposed sides partially folded inwardly with the adjacent walls partially collapsed.

FIG. 7 illustrates the tube where the cross section is rectangular or other than circular when in the uncollapsed state. FIG. 7 depicts a tube 100 of rectangular cross section having opposed sides 102, 104 thereof accordian folded as at 106 such that the unfolded sides 108, 110 are partially collapsed toward each other. Thus when a sudden gas pressure is introduced into the interior 112 of tube 100, sides 102 and 104 unfold, causing sides 108 and 110 to become further separated. Where side 108 is fixed and side 110 applied to a load, the load, such as a knife, is caused to do work. It should be noted that the configuration of the working surface of the present device produces about 3.78 times as much force as a piston and cylinder arrangement of the same diameter. This ratio is based upon the surface of a piston of the same diameter as the tube of 5/8 inch ID, with a length of 1.88 inches. Thus with the same pressure applied to a piston of 5/8 inch diameter over an area of 0.3 square inches as compared to an area of 1.128 square inches.

What is claimed is:

1. A gas operated single stroke servo-motor which comprises: a rigid body having a cavity therein open at one end and closed at the other, a tool receiving passage intermediate the ends of the cavity opening onto the outside of the body, and a wall area within said cavity opposite the tool receiving passage shaped to reinforce the adjacent wall surface of a tubular element placed thereagainst; a deformable tubular member having a hollow interior located within the body cavity with one end in abutting relation to the closed end of the latter and a portion of its exterior surface in face-to-face contacting relation with said cavity's reinforcing area, said tubular member having at least one wall thereof deformed and folded inwardly into the interior thereof to provide a fold therein; plug means mounted in the open end of the body cavity for adjustable movement into essentially fluid-tight sealed engagement with the adjacent end of the tubular member housed therein, said plug cooperating with the closed end of said cavity and with said tubular member when held therebetween to define an essentially fluid-tight sealed chamber inside the latter, and said elements further cooperating to maintain the essentially fluid-tight sealed condition of said chamber while its volume becomes greater in response to an increase in internal fluid pressure of a magnitude sufficient to at least partially unfold the fold in the folded wall; conduit means connectable to a source of fluid under pressure communicating with the interior of the sealed chamber; and, tool means operatively associated with the tubular member responsive to the unfolding of the latter to move from a retracted position confined within the tool receiving passage into an extended position.

2. The servo-motor as set forth in claim 1 in which: the tool means comprises a blade; and, in which the tool receiving passage comprises a slit sized to guide the latter during its excursion from retracted into extended position.

3. A gas operated single stroke servo-motor which comprises: a rigid body having a cavity therein open at one end and closed at the other, a tool receiving passage intermediate the ends of the cavity opening onto the outside of the body, and a wall area within said cavity opposite the tool receiving passage shaped to reinforce the adjacent wall surface of a tubular element placed thereagainst; a deformable hollow tubular member located within the body cavity with one end in abutting relation to the closed end of the latter and a portion of its exterior surface in face-to-face contacting relation with said cavity's reinforcing area, said tubular member having its wall nearest the tool receiving passage folded inwardly toward the reinforced wall to provide a fold therein; plug means mounted in the open end of the body cavity for adjustable movement into essentially fluid-tight sealed engagement with the adjacent end of the tubular member housed therein, said plug cooperating with the closed end of said cavity and with said tubular member when held therebetween to define an essentially fluid-tight sealed chamber inside the latter, and said elements further cooperating to maintain the essentially fluid-tight sealed condition of said chamber while its volume becomes greater in response to an increase in internal fluid pressure of a magnitude sufficient to at least partially unfold the fold in the folded wall; conduit means connectable to a source of fluid under pressure communicating with the interior of the sealed chamber; and, tool means operatively associated with the folded wall of the tubular member responsive to the unfolding of the latter to move from a retracted position confined within the tool receiving passage into an extended position adapted to engage a workpiece located in the path thereof.

4. The servo-motor as set forth in claim 3 in which: the tool means comprises a blade; and, in which the tool receiving passage comprises a slit sized to guide the latter during its excursion from retracted into extended position.

5. The servo-motor as set forth in claim 1 in which: the tool means is releasably held in retracted position.

6. The servo-motor as set forth in claim 1 in which: a shear pin depending from the body releasably holds the tool means in retracted position.

7. The servo-motor as set forth in claim 1 in which: the folded wall section lies in spaced relation to the opposed surface of the reinforced wall portion so as to define therewith a partially collapsed condition wherein generally pear shaped lobes are produced on opposite sides of the fold communicating with one another across the latter.

8. The servo-motor as set forth in claim 1 in which: the fold in the folded wall is loose and rounded.

9. The servo-motor as set forth in claim 1 in which: the body includes a passage intersecting the path of movement of the tool means and adapted to receive a workpiece and maintain same in position for engagement by the latter.

10. The servo-motor as set forth in claim 1 in which: the reinforcing wall area of the body cavity is semi-cylindrical; and, in which the tubular member has a cylindrical wall surface in engagement therewith.

11. The servo-motor as set forth in claim 1 in which: the opposed surfaces of the plug means and closed end of the body cavity in engagement with the tubular member are planar and essentially parallel to one another; and, in which the opposite open ends of the tubular member are cut off normal to its longitudinal axis.

12. The servo-motor as set forth in claim 1 in which: the body includes a surface located beyond the tool receiving passage positioned and adapted to receive the tool means and stop same in its extended position.

13. The servo-motor as set forth in claim 2 in which: the sharpened edge of the blade is essentially straight and extends at right angles to the direction of its movement; and, in which the body includes a planar surface located in the path of blade movement positioned to define a support for a workpiece to be cut by the latter.

14. The servo-motor as set forth in claim 6 in which: the shear pin passes through the tool means.

15. The servo-motor as set forth in claim 4 in which: the conduit means opens into the end of at least one of said lobes.

16. The servo-motor as set forth in claim 4 in which: the conduit means includes branches opening into both of said lobes.

17. The servo-motor as set forth in claim 7 in which: the body includes a surface positioned and adapted to support a workpiece located within said workpiece receiving passage and support same in the path of the tool means.

* * * * *